US007839468B2

(12) United States Patent
You et al.

(10) Patent No.: US 7,839,468 B2
(45) Date of Patent: Nov. 23, 2010

(54) WHITE PHOSPHOR, LIGHT EMISSION DEVICE INCLUDING THE SAME, AND LIQUID CRYSTAL DISPLAY DEVICE INCLUDING THE LIGHT EMISSION DEVICE AS BACKLIGHT UNIT

(75) Inventors: Yong-Chan You, Suwon-si (KR);
Jae-Woo Bae, Suwon-si (KR);
Gyeong-Jae Heo, Suwon-si (KR);
Kyu-Chan Park, Suwon-si (KR);
Sang-Hyuk Lee, Suwon-si (KR);
Sun-Hwa Kwon, Suwon-si (KR);
Ji-Hyun Kim, Suwon-si (KR);
Young-Suk Cho, Suwon-si (KR);
Ui-Song Do, Suwon-si (KR);
Byung-Kyun Kim, Suwon-si (KR);
Hui-Young Ku, Suwon-si (KR);
Yoo-Jung Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 259 days.

(21) Appl. No.: 12/199,232

(22) Filed: Aug. 27, 2008

(65) Prior Publication Data
US 2009/0174841 A1 Jul. 9, 2009

(30) Foreign Application Priority Data
Jan. 9, 2008 (KR) .................. 10-2008-0002555

(51) Int. Cl.
*G02F 1/1335* (2006.01)
*C09K 11/08* (2006.01)
*H01J 1/62* (2006.01)

(52) U.S. Cl. .................... 349/70; 349/69; 252/301.4 R; 313/503

(58) Field of Classification Search .................. 349/70, 349/69, 71, 202, 61, 56; 252/301.4 R; 313/503
See application file for complete search history.

(56) References Cited

U.S. PATENT DOCUMENTS 5,808,409 A * 9/1998 Matsuda et al. ............. 313/486

(Continued)

FOREIGN PATENT DOCUMENTS

EP 0148110 10/1985

(Continued)

OTHER PUBLICATIONS

Office Action issued in corresponding European Patent Application No. 08168571.1 dated Jan. 27, 2009.

(Continued)

*Primary Examiner*—Brian M Healy
(74) *Attorney, Agent, or Firm*—Christie, Parker & Hale, LLP (57) ABSTRACT

A white phosphor, a light emission device including the same, and a liquid crystal display (LCD) including the light emission device as a backlight unit. The white phosphor includes: 40 to 50 parts by weight of a blue phosphor selected from the group consisting of $ZnS:(Ag,Cl)$, $ZnS:(Ag,Al)$, $ZnS:(Ag,Al,Cl)$, and a combination thereof; 23 to 36 parts by weight of a green phosphor including $(Sr_{1-x}Ca_x)Ga_2S_4:Eu$ ($0 \leq x < 0.2$) and a compound selected from the group consisting of $ZnS:(Cu,Al)$, $ZnS:(Cu,Au,Al)$, and a combination thereof; and 20 to 30 parts by weight of a red phosphor selected from the group consisting of $Y_2O_3:Eu$, $Y_2O_3:(Eu,Tb)$, $Y_2O_2S:Eu$, $Y_2O_2S:(Eu,Tb)$, and a combination thereof.

28 Claims, 4 Drawing Sheets

U.S. PATENT DOCUMENTS

| | | | |
|---|---|---|---|
| 6,875,372 B1 | 4/2005 | Hampden-Smith et al. | 252/301.4 R |
| 7,476,337 B2 * | 1/2009 | Sakane et al. | 252/301.4 F |
| 7,476,338 B2 * | 1/2009 | Sakane et al. | 252/301.4 F |
| 2005/0012447 A1 | 1/2005 | Komatsu et al. | 313/503 |
| 2006/0065878 A1 * | 3/2006 | Sakane et al. | 252/301.4 F |
| 2009/0174841 A1 * | 7/2009 | You et al. | 349/70 |

FOREIGN PATENT DOCUMENTS

| | | |
|---|---|---|
| EP | 1273645 | 1/2003 |
| GB | 2144445 | 3/1985 |
| JP | 2005-194340 | 7/2005 |
| KR | 2004-0093374 | 11/2004 |
| KR | 2006-0046707 | 5/2006 |
| KR | 2007-0075552 | 7/2007 |
| KR | 10-768177 | 10/2007 |

OTHER PUBLICATIONS

English Abstract for Korean Publication No. 10-2002-0072868.
U.S. Appl. No. 12/199,209, filed Aug. 27, 2008, Yong-Chan You et al., Samsung SDI Co., Ltd.

* cited by examiner

WHITE PHOSPHOR, LIGHT EMISSION DEVICE INCLUDING THE SAME, AND LIQUID CRYSTAL DISPLAY DEVICE INCLUDING THE LIGHT EMISSION DEVICE AS BACKLIGHT UNIT

CROSS-REFERENCE TO RELATED APPLICATION

This application claims priority to and the benefit of Korean Patent Application No. 2008-2555, filed in the Korean Intellectual Property Office on Jan. 9, 2008, the disclosure of which is incorporated herein, by reference.

BACKGROUND OF THE INVENTION

1. Field of the Invention

Aspects of the present invention relate to a white phosphor, a light emission device including the same, and a liquid crystal display (LCD) including the light emission device as a backlight unit.

2. Description of the Related Art

A liquid crystal display is a type of flat panel display device that displays an image by varying a light transmission amount of pixels, using dielectric anisotropy to vary the orientation of liquid crystals, according to a voltage applied. A liquid crystal display is lighter, smaller, and uses less power than a conventional cathode ray tube.

A liquid crystal display includes a liquid crystal (LC) panel assembly and a backlight unit. The backlight unit projects light to the LC panel assembly, and the LC panel assembly selectively transmits the light, using a liquid crystal layer.

A backlight unit is classified according to the type of light source included therein, for example, a cold cathode fluorescent lamp (CCFL). Since a CCFL uses a line light source, light emitted from CCFL should be dispersed toward a liquid crystal panel assembly, through optical members, such as a diffuser sheet, a diffuser, and a prism sheet.

However, since the light emitted from CCFL may be absorbed by the optical members, high-intensity light is generally used, resulting in high power consumption. It is also difficult to produce a large-sized liquid crystal display (over 30-inches), due to structural limitations.

An LED-type backlight unit employing light emitting diodes (LEDs) is also well known. A LED is a spot light source, and thus, an LED-type backlight unit generally includes a plurality of LEDs. An LED-type backlight unit has a fast response time and good color reproduction. However, an LED-type backlight unit is costly and increases an overall thickness of a liquid crystal display.

As described above, all of the conventional backlight units, including the field emission type backlight unit, have inherent problems. In addition, conventional backlight units are driven so as to maintain a predetermined brightness all over a light emission surface, when the liquid crystal display is driven. Therefore, it is difficult to significantly improve image quality.

For example, when a LC panel assembly displays a high contrast image, it will be possible to realize an image having an improved dynamic contrast, if the backlight unit could locally emit different intensities of light to pixels of the LC panel assembly. However, conventional backlight units cannot achieve the above function, and thus, there is a limitation in the dynamic contrast of an image.

SUMMARY OF THE INVENTION

One exemplary embodiment of the present invention provides a white phosphor having excellent brightness, color reproduction characteristics, and a uniform color temperature.

Another exemplary embodiment of the present invention provides a light emission device including the white phosphor.

Another exemplary embodiment of the present invention provides a display device including the light emission device as a backlight unit.

According to an exemplary embodiment of the present invention, provided is a white phosphor that includes: 40 to 50 parts by weight of a blue phosphor selected from the group consisting of $ZnS:(Ag,Cl)$, $ZnS:(Ag,Al)$, $ZnS:(Ag,Al,Cl)$, and combinations thereof; 23 to 36 parts by weight of a green phosphor including $(Sr_{1-x}Ca_x)Ga_2S_4:Eu$ ($0 \leq x < 0.2$) and a compound selected from the group consisting of $ZnS:(Cu,Al)$, $ZnS:(Cu,Au,Al)$, and a combination thereof; and 20 to 30 parts by weight of a red phosphor selected from the group consisting of $Y_2O_3:Eu$, $Y_2O_3:(Eu,Tb)$, $Y_2O_2S:Eu$, $Y_2O_2S:(Eu,Tb)$, and a combination thereof.

According to another exemplary embodiment of the present invention, provided is a light emission device that includes: opposing first and second substrates; an electron emission unit disposed on one surface of the first substrate; and a light emission unit disposed on one surface of the second substrate. The light emission unit includes a phosphor layer disposed on one surface of the second substrate. The phosphor layer includes the white phosphor.

According to yet another exemplary embodiment of the present invention, provided is a liquid crystal display (LCD) that includes the light emission device and a liquid crystal panel assembly disposed in front of the light emission device, to selectively transmit light emitted from the light emission device, so as to display an image.

According to aspects of the present invention, the white phosphor has excellent brightness, color reproduction characteristics, and a uniform color temperature.

According to aspects of the present invention, the light emission device can improve the color reproduction characteristics of a light emission device.

According to aspects of the present invention, the light emission device can improve the image quality of a liquid crystal display (LCD).

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

As referred to herein, when a first element is said to be disposed or formed "on", or "adjacent to", a second element, the first element can directly contact the second element, or can be separated from the second element by one or more other elements located therebetween. In contrast, when an element is referred to as being disposed or formed "directly on" another element, there are no intervening elements present. As used herein, the term "and/or" includes any and all combinations of one or more of the associated listed items.

A white phosphor, according to one exemplary embodiment of the present invention, includes: 40 to 50 parts by weight of a blue phosphor selected from the group consisting of ZnS:(Ag,Cl), ZnS:(Ag,Al), ZnS:(Ag,Al,Cl), and combinations thereof; 23 to 36 parts by weight of a green phosphor including $(Sr_{1-x}Ca_x)Ga_2S_4$:Eu ($0 \leq x < 0.2$) and a compound selected from the group consisting of ZnS:(Cu,Al), ZnS:(Cu,Au,Al), and a combination thereof; and 20 to 30 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and a combination thereof.

The white phosphor is prepared by mixing the above red phosphor, green phosphors, and blue phosphor, at a predetermined ratio. The color temperature of the white phosphor can be adjusted by adjusting the mixing ratio of the phosphors. One of the green phosphors has a high brightness and the other green phosphor has excellent color reproduction, such that the white phosphor has excellent brightness and/or reproduction characteristics.

In one exemplary embodiment, the white phosphor includes 42 to 49 parts by weight of the blue phosphor, 24 to 32 parts by weight of the green phosphor, and 24 to 30 parts by weight of the red phosphor. In another exemplary embodiment, the white phosphor includes 43 to 49 parts by weight of the blue phosphor, 25 to 31 parts by weight of the green phosphor, and 25 to 27 parts by weight of the red phosphor.

When the content of the blue phosphor exceeds the upper limit of the weight range, the color temperature increases, but the luminance decreases. When the content of the green phosphor exceeds the upper limit of the weight range, the luminance increases, the color temperature decreases, and a greenish white color is produced. When the content of the red phosphor exceeds the upper limit of the weight range, the luminance decreases, and a reddish white color is produced, which thereby decreases the color temperature.

When the content of the blue phosphor is less than the lower limit of the weight range, the luminance increases, but the color temperature decreases. When the content of the green phosphor is less than the lower limit of the weight range, the luminance decreases, and the color temperature increases. When the content of the red phosphor is less than the lower limit of the weight range, a greenish white color is produced.

The white phosphor generally has a color temperature ranging from 10,000 to 13,000K. In one exemplary embodiment of the present invention, the luminance and color temperature of the white phosphor can be optimally adjusted, by simulating a mixing ratio of red, green, and blue phosphors having a predetermined color coordinate and luminance. A mixing ratio of the red, green, and blue phosphors can also be defined using a color difference, as well as the luminance and color temperature of the white phosphor.

When the white phosphor, including 40 to 50 parts by weight of the blue phosphor, 23 to 36 parts by weight of the green phosphor, and 20 to 30 parts by weight of the red phosphor, is excited by electron beams, the white phosphor has a color temperature ranging from 10,000 to 13,000K.

When the white phosphor, including 40 to 45 parts by weight of the blue phosphor, 28 to 33 parts by weight of the green phosphor, and 26 to 28 parts by weight of the red phosphor, is excited by electron beams, the white phosphor has a color temperature of 10,000 to 11,500K.

When the white phosphor, including 46 to 50 parts by weight of the blue phosphor, 25 to 28 parts by weight of the green phosphor, and 25 to 27 parts by weight of the red phosphor, is excited by electron beams, the white phosphor has a color temperature ranging from 11,000 to 13,000K.

The compound selected from the group consisting of ZnS:(Cu,Al), ZnS:(Cu,Au,Al), and a combination thereof improves the brightness of the green phosphor. The $(Sr_{1-x}Ca_x)Ga_2S_4$:Eu ($0 \leq x < 0.2$) improves the color reproduction characteristics of the green phosphor. The mixing ratio of the two components of the green phosphor may be varied, so as to change the brightness, color reproduction, and color temperature of the white phosphor.

The compound selected from the group consisting of ZnS:(Cu,Al), ZnS:(Cu,Au,Al), and a combination thereof can be included in an amount of 20 to 50 parts by weight, and the $(Sr_{1-x}Ca_x)Ga_2S_4$:Eu ($0 \leq x < 0.2$) can be included in an amount of 50 to 80 parts by weight.

When the compound selected from the group consisting of ZnS:(Cu,Al), ZnS:(Cu,Au,Al), and a combination thereof is included in an amount of 50 parts by weight or less, excellent color reproduction characteristics can be realized in the white phosphor. When the $(Sr_{1-x}Ca_x)Ga_2S_4$:Eu is included in an amount of 50 parts by weight, or more, the white phosphor has a wide color reproduction range and a high brightness.

A light emission device, according to one exemplary embodiment of the present invention, includes first and second substrates arranged opposite to each other; a light emission unit disposed on one surface of the first substrate; and a light emission unit disposed on one surface of the second substrate. The light emission unit includes a phosphor layer disposed on one surface of the second substrate. The phosphor layer includes the above white phosphor.

A liquid crystal display (LCD), according to one exemplary embodiment of the present invention, includes the above light emission device and a liquid crystal panel assembly disposed on the front of the light emission device. The panel assembly selectively transmits light emitted from the light emission device, to display an image.

Figure 1:
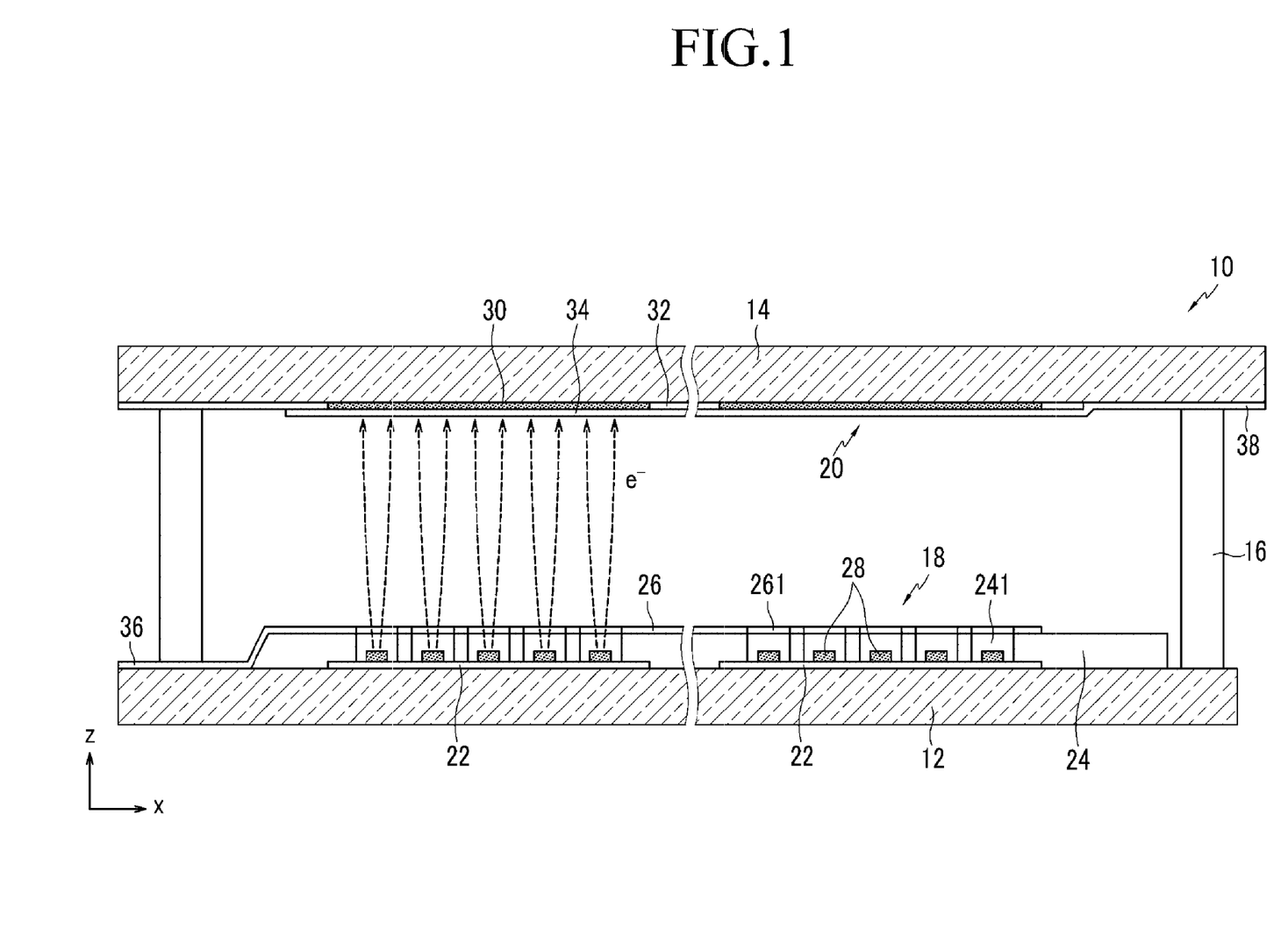
FIG. 1 is a sectional view of a light emission device, according to an exemplary embodiment of the present invention.
Figure 2:
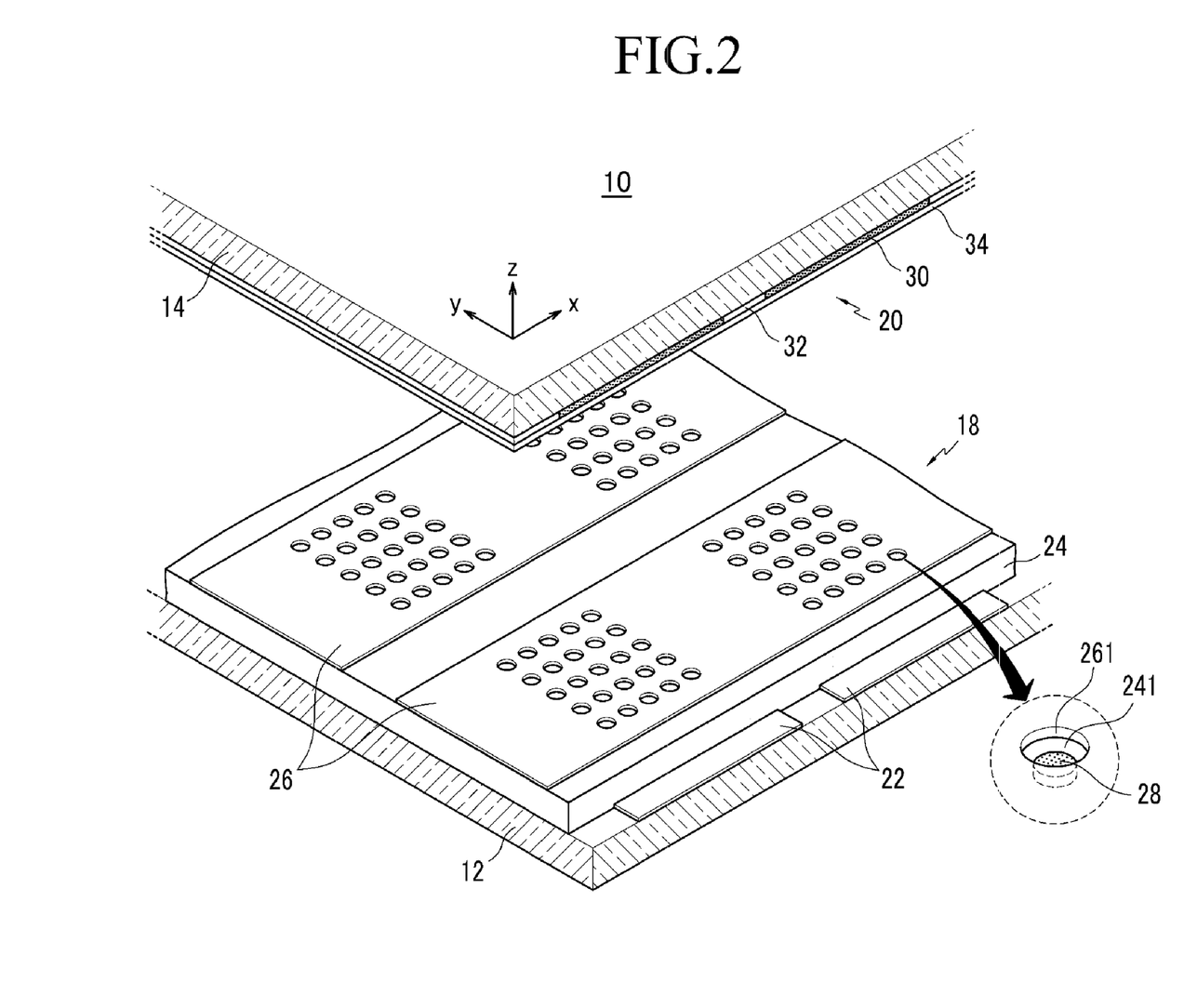
FIG. 2 is a partial exploded perspective view of the light emission device of FIG. 1.

FIG. 1 is a sectional view of a light emission device, according to an exemplary embodiment of the present invention, and FIG. 2 is a partial exploded perspective view of the light emission device of FIG. 1.

Referring to FIG. 1, a light emission device 10 includes opposing first and second substrates 12 and 14 that are spaced apart at a predetermined interval. A sealing member 16 is provided at the peripheries of the first and second substrates 12 and 14, to seal them together, and thus, form a sealed envelope. The interior of the sealed envelope is at a vacuum of about 10-6 Torr.

Each of the first and second substrates 12 and 14 has an active area that emits visible light and an inactive area that surrounds the active area, both or which are disposed within the seal member 16. An electron emission unit 18 to emit electrons is provided on the active area of the first substrate 12. A light emission unit 20 to emit visible light is proved on the active area of the second substrate 14.

Referring to FIG. 2, the electron emission unit 18 includes: cathodes 22 (first electrodes) arranged in a striped pattern along one direction of the first substrate 12; gate electrodes 26 (second electrodes) arranged in a striped pattern across the cathodes 22; an insulating layer 24 arranged between the cathodes 22 and the gate electrodes 26; and electron emission regions 28 electrically connected to the cathodes 22.

The cathodes 22 can be arranged in rows along the first substrate 12 and can be referred to as scan electrodes. Alternatively, the cathodes 22 can be arranged in columns along the first substrate 12 and can be referred to as data electrodes.

Openings 261 and 241 are formed through the insulating layer 24 and the gate electrode 26, respectively, where the cathodes 22 and gate electrodes 26 cross. The openings 261 and 241 are overlapped, to partially expose the cathodes 22. The electron emission regions 28 are electrically connected to the cathodes 22 and are exposed by the openings 261 and 241.

The electron emission regions 28 are formed of a material that emits electrons when an electric field is applied thereto, under a vacuum atmosphere, such as a carbon-based material, or a nanometer-sized material. The electron emission regions 28 can be formed of carbon nanotubes, graphite, graphite nanofibers, diamonds, diamond-like carbon, fullerene, silicon nanowires, or a combination thereof. The electron emission regions 28 can be formed through a screen-printing process, a direct growth process, a chemical vapor deposition process, or a sputtering process. Alternatively, the electron emission regions 28 can be tip-shaped structures formed of a Mo-based, or a Si-based, material.

One crossing region of the cathode 22 and gate electrode 26 may correspond to one pixel region of the light emission device 10. Alternatively, two or more crossing regions of the cathode 22 and gate electrode 26 may correspond to one pixel region of the light emission device 10. In this exemplary embodiment, two or more cathodes 22 and/or two or more gate electrodes 26 that are placed in one pixel region are electrically connected to each other, to receive a common driving voltage.

The light emission unit 20 includes phosphor layers 30 that are spaced apart in a predetermined pattern, on one surface of the second substrate 14. Dark colored layers 32 are disposed between the phosphor layers 30. Metallic reflective layers 34 are disposed on the phosphor layers 30 and dark colored layers 32. The light emission unit 20 may not include the dark colored layers 32. The phosphor layers may be formed on the entire surface of the second substrate 14, without the dark colored layer 32 being disposed between the phosphor layers 30.

The metallic reflective layer 34 may be used as an anode. When the metallic reflective layer 34 is used as an anode, it becomes an acceleration electrode that receives a high voltage to maintain the phosphor layer 30 at a high electric potential. The metallic reflective layer 34 enhances the luminance, by reflecting the visible light, which is emitted from the phosphor layers 30 toward the first substrate 12, toward the second substrate 14.

According to one exemplary embodiment, the anode is a transparent conductive layer formed of ITO (indium tin oxide). The transparent conductive layer is arranged between the second substrate 14 and phosphor layers 30, and may include multiple layers disposed in a predetermined pattern. According to another exemplary embodiment, the both transparent conductive layer and the metallic reflective layer 34 may operate as an anode.

The phosphor layers 30 include a white phosphor layers that emit white light. The white phosphor layers include the white phosphor, according to an exemplary embodiment of the present invention. The white phosphor includes 40 to 50 parts by weight of a blue phosphor selected from the group consisting of ZnS:(Ag,Cl), ZnS:(Ag,Al), ZnS:(Ag,Al,Cl), and combinations thereof; 23 to 36 parts by weight of a green phosphor including $(Sr_{1-x}Ca_x)Ga_2S_4$:Eu $(0 \leq x < 0.2)$ and a compound selected from the group consisting of ZnS:(Cu,Al), ZnS:(Cu,Au,Al), and a combination thereof; and 20 to 30 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and a combination thereof.

Two phosphor layers 30 may be disposed over one pixel region, or more than two phosphor layers 30 may be disposed over one pixel region. Also, one phosphor layer 30 may be disposed over more than two pixel regions. In all of the three cases, the phosphor layer 30 may be rectangular.

Spacers (not shown) are disposed between the first and second substrates 12 and 14. The spacers uniformly maintain a gap between the first and second substrates 12 and 14.

The light emission device 10 is driven by a voltage that is applied to the cathodes 22, the gate electrodes 26, and the anode. In FIG. 1, the light emission device 10 includes a gate lead line 36 extending from the gate electrodes 26 and an anode lead line 38 extending from the anode.

An electric field is formed around the electron emission regions 28, at pixel regions where a voltage difference between the cathodes 22 and gate electrodes 26 is higher than a threshold value, thereby emitting electrons from the electron emission regions 28. The emitted electrons are accelerated by the high voltage applied to the metallic reflective layer 34, so as to collide with the phosphor layers 30, thereby exciting the phosphor layers 30. A light emission intensity of the phosphor layers 30 at each pixel corresponds to an electron emission amount of the corresponding pixel.

The first substrate 12 and the second substrate 14 may be spaced apart further than those in a general field emission display. For example, the first and second substrates 12, 14 may be separated by 10 mm, or more. A voltage of 10 kV, or more, may be applied to the metal reflective layer 34. The high voltage enhances the brightness of the white phosphor.

Figure 3:
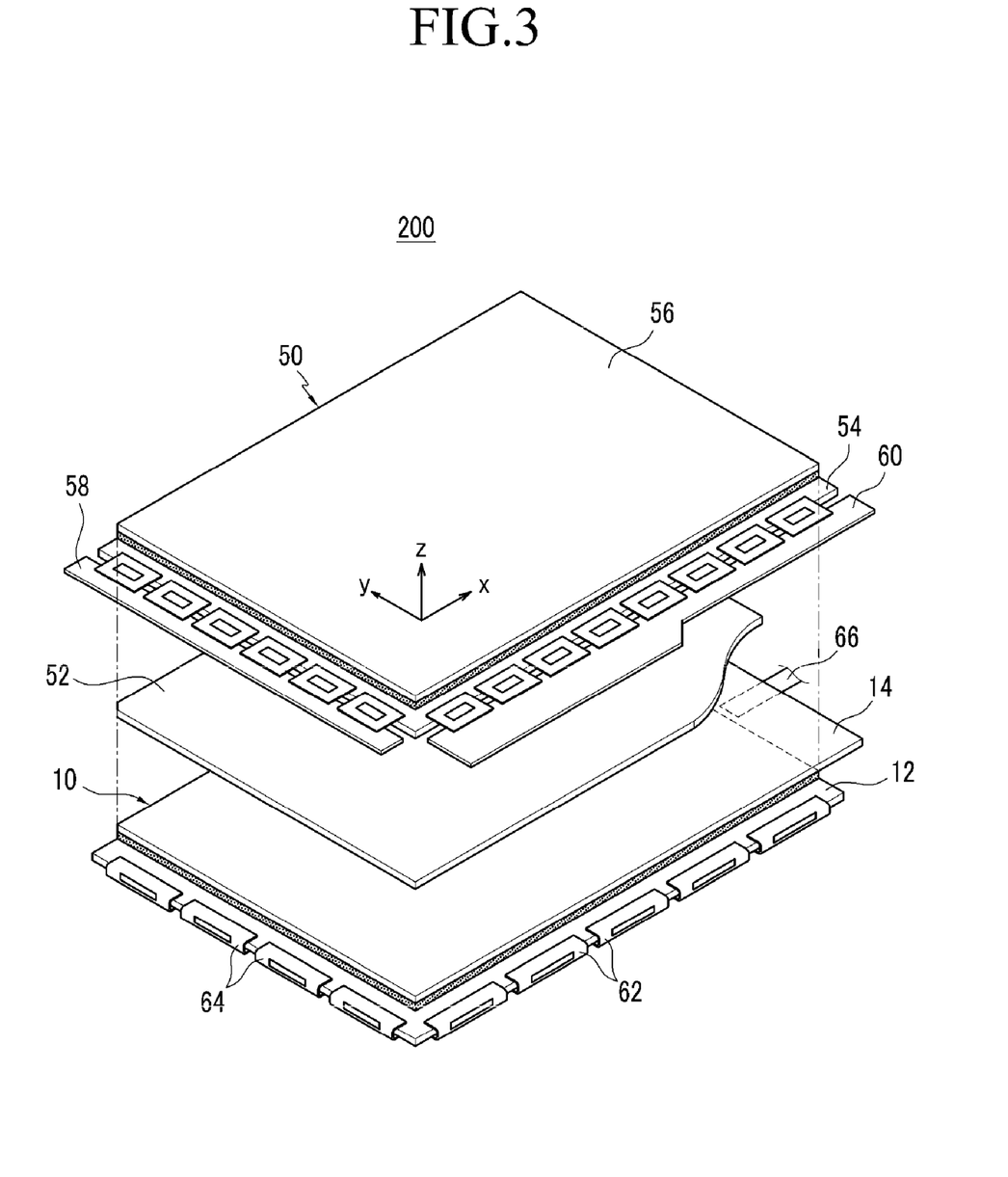
FIG. 3 is a partial exploded perspective view of a display device, according to one exemplary embodiment of the present invention.

FIG. 3 is an exploded perspective view of a liquid crystal display (LCD), according to an exemplary embodiment of the present invention. Referring to FIG. 3, a liquid crystal display (LCD) 50 includes a liquid crystal panel assembly 52 including a plurality of pixels disposed in rows and columns, and a light emission device 10 to illuminate the liquid crystal panel assembly 52. The liquid crystal panel assembly 52 can be a conventional liquid crystal panel assembly. The light emission device 10 can be referred to as a backlight unit.

The following examples illustrate the aspects of the present invention in more detail. However, it is understood that the present invention is not limited by these examples.

Preparation Example 1 to 9

Green phosphors were prepared by mixing ZnS:Cu,Al and $(Sr_{1-x}Ca_x)Ga_2S_4$:Eu at weight ratios described in the following Table 1. Color temperatures, color coordinates, and color reproduction ranges of the green phosphors were measured using a contact brightness meter (CA-100, produced by the Minolta Company). The results are shown in the following Table 1.

TABLE 1

| ZnS:Cu,Al | $(Sr_{1-x}Ca_x)Ga_2S_4$:Eu | Color temperature (K) | Color coordinate x | Color coordinate y | Color reproduction range (%) |
|---|---|---|---|---|---|
| 1 | 0 | 100 | 9,800 | 0.273 | 0.710 | 90 |
| 2 | 20 | 80 | 11,565 | 0.284 | 0.679 | 84 |
| 3 | 40 | 60 | 11,960 | 0.294 | 0.658 | 80 |
| 4 | 45 | 55 | 11,800 | 0.295 | 0.654 | 79 |
| 5 | 50 | 50 | 12,120 | 0.295 | 0.650 | 79 |
| 6 | 55 | 45 | 11,940 | 0.296 | 0.646 | 78 |
| 7 | 60 | 40 | 12,350 | 0.297 | 0.645 | 78 |
| 8 | 80 | 20 | 12,910 | 0.299 | 0.629 | 75 |
| 9 | 100 | 0 | 13,500 | 0.305 | 0.616 | 72 |

Referring to Table 1, when the white phosphor included at least 20 parts by weight of the $(Sr_{1-x}Ca_x)Ga_2S_4$:Eu ($0 \leq x < 0.2$), the color reproduction range of the white phosphor exceeded 72%, which equates to the color reproduction range of a conventional CCFL. When the white phosphor included at least 50 parts by weight of the $(Sr_{1-x}Ca_x)Ga_2S_4$:Eu ($0 \leq x < 0.2$), the white phosphor having had a color reproduction range of at least 80%, which resulted in a high brightness.

Example 1

43.8 parts by weight of a ZnS:(Ag,Al) blue phosphor, 29.3 parts by weight of a green phosphor including ZnS:(Cu,Al) and $(Sr_{0.9}Ca_{0.1})Ga_2S_4$:Eu, at a 20:80 weight ratio, and 26.9 parts by weight of a $Y_2O_3$:Eu red phosphor were mixed, to prepare a white phosphor. A rectangular electrode layer was formed on a substrate, and the white phosphor was applied to the substrate, to thereby prepare a white phosphor layer.

Subsequently, Al was deposited on the white phosphor layer by chemical vapor deposition, to thereby form a metallic reflective layer. The resultant structure was baked at 480° C., for 0.5 to 1 hour, to thereby prepare a light emission unit.

Example 2

A light emission unit was fabricated according to the same method as in Example 1, except that 45.4 parts by weight of a ZnS:(Ag,Al) blue phosphor, 28.5 parts by weight of a green phosphor including ZnS:(Cu,Al) and $(Sr_{0.9}Ca_{0.1})Ga_2S_4$:Eu, at a 20:80 weight ratio, and 26.2 parts by weight of a $Y_2O_3$:Eu red phosphor, were used.

Example 3

A light emission unit was fabricated according to the same method as in Example 1, except that 46.9 parts by weight of a ZnS:(Ag,Al) blue phosphor, 27.8 parts by weight of a green phosphor including ZnS:(Cu,Al) and $(Sr_{0.9}Ca_{0.1})Ga_2S_4$:Eu, at a 20:80 weight ratio, and 25.3 parts by weight of a $Y_2O_3$:Eu red phosphor, were used.

Example 4

A light emission unit was fabricated according to the same method as in Example 1, except that 48.5 parts by weight of a ZnS:(Ag,Al) blue phosphor, 26.9 parts by weight of a green phosphor including ZnS:(Cu,Al) and $(Sr_{0.9}Ca_{0.1})Ga_2S_4$:Eu, at a 20:80 weight ratio, and 26.2 parts by weight of a $Y_2O_3$:Eu red phosphor, were used.

Measurement 1: Light Emitting Characteristics of Light Emission Unit

The color temperature, brightness, and color coordinates, of the light emission devices manufactured according to Examples 1 to 4, were measured using a contact-type photometer (CA-100, produced by the Minolta Company). The results are shown in the following Table 2.

TABLE 2

| Example | Color temperature (K) | Brightness (cd/m$^2$) | Color coordinate x | Color coordinate y |
|---|---|---|---|---|
| 1 | 10,306 | 6,707 | 0.2555 | 0.3362 |
| 2 | 10,945 | 6,040 | 0.2550 | 0.3182 |
| 3 | 11,752 | 6,630 | 0.2524 | 0.3102 |
| 4 | 12,328 | 6,259 | 0.2520 | 0.3030 |

Referring to Table 2, the light emission units according to Examples 1 to 4 emit white light, had good brightness, and had color temperatures of about 10,000K to 13,000K.

Example 5

A light emission unit was fabricated according to the same method as in Example 1, except that a green phosphor including $SrGa_2S_4$:Eu and ZnS:(Cu,Al), at a 80:20 weight ratio, was used.

Comparative Example 1

A light emission unit was fabricated according to the same method as in Example 1, except that a $SrGa_2S_4$:Eu green phosphor was used.

Comparative Example 2

A light emission unit was fabricated according to the same method as in Example 1, except that a ZnS:(Cu,Al) green phosphor was used.

Measurement 2: Light Emitting Characteristics of Light Emission Unit

Figure 4:
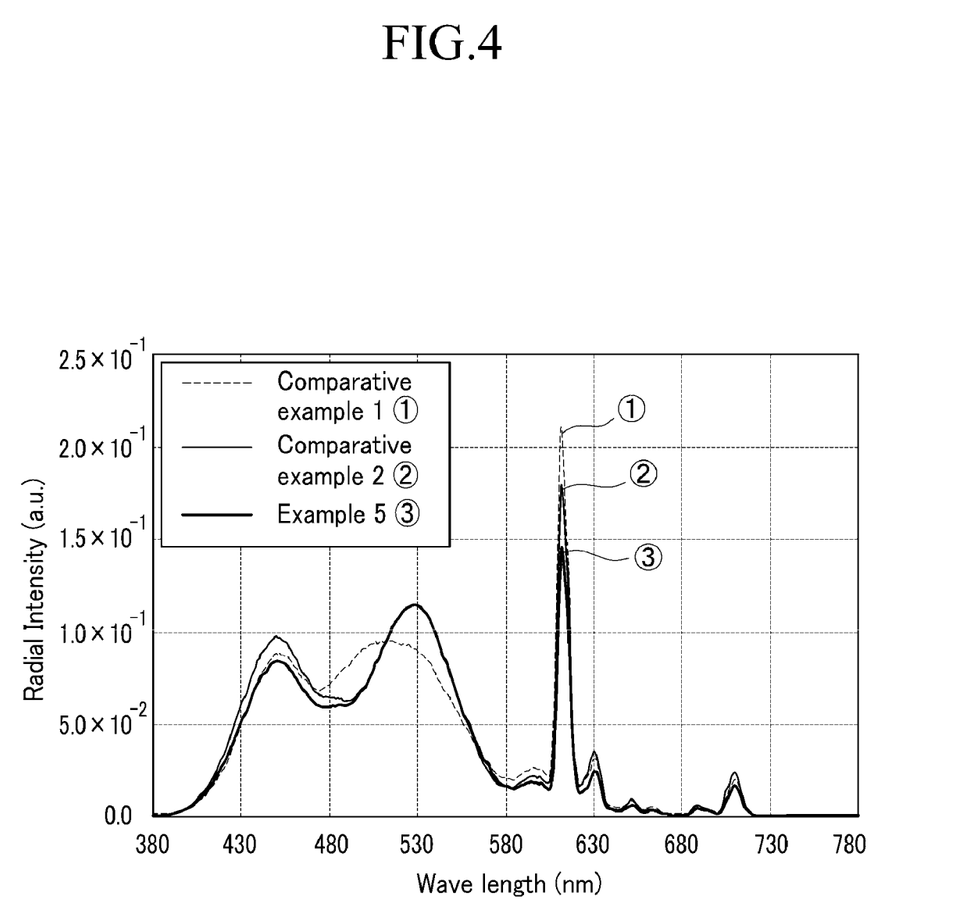
FIG. 4 shows light emitting spectra of light emission units according to Example 5, and Comparative Examples 1 and 2.

Light emitting spectra and color reproduction ranges of the light emission units according to Example 5, and Comparative Examples 1 and 2 were measured using a contact brightness meter (CA-100, produced by the Minolta Company). A white color temperature is generally about 11,000K. The light emitting spectra measurement results are shown in FIG. 4.

The light emission unit according to Comparative Example 1 (including the ZnS:(Cu,Al)) showed a 72% color reproduction range, relative to that of a National Television System Committee (NTSC) reference. The light emission unit according to Comparative Example 2 (including the SrGa$_2$S$_4$:Eu) showed a 90% color reproduction range relative to the NTSC reference. In comparison, the light emission unit according to Example 5 (including the SrGa$_2$S$_4$:Eu and the ZnS:Cu,Al) showed an 84% color reproduction range relative to the NTSC reference. However, the light emission unit according to Comparative Example 2 (including only the SrGa$_2$S$_4$:Eu) had an undesirable color temperature of 9,800K, as shown in Table 1.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A white phosphor comprising:
   40 to 50 parts by weight of a blue phosphor selected from the group consisting of ZnS:(Ag,Cl), ZnS:(Ag,Al), ZnS:(Ag,Al,Cl), and a combination thereof;
   23 to 36 parts by weight of a green phosphor comprising (Sr$_{1-x}$Ca$_x$)Ga$_2$S$_4$:Eu (0≦x<0.2) and a compound selected from the group consisting of ZnS:(Cu,Al), ZnS:(Cu,Au,Al), and a combination thereof; and
   20 to 30 parts by weight of a red phosphor selected from the group consisting of Y$_2$O$_3$:Eu, Y$_2$O$_3$:(Eu,Tb), Y$_2$O$_2$S:Eu, Y$_2$O$_2$S:(Eu,Tb), and a combination thereof.

2. The white phosphor of claim 1, wherein the white phosphor has a color temperature ranging from 10,000K to 13,000K, when excited by an electron beam.

3. The white phosphor of claim 1, wherein the white phosphor comprises 40 to 45 parts by weight of the blue phosphor, 28 to 33 parts by weight of the green phosphor, and 26 to 28 parts by weight of the red phosphor.

4. The white phosphor of claim 3, wherein the white phosphor has a color temperature ranging from 10,000K to 11,500K, when excited by an electron beam.

5. The white phosphor of claim 1, wherein the white phosphor comprises 46 to 50 parts by weight of the blue phosphor, 25 to 28 parts by weight of the green phosphor, and 25 to 27 parts by weight of the red phosphor.

6. The white phosphor of claim 5, wherein the white phosphor has a color temperature ranging from 11,000K to 13,000K, when excited by an electron beam.

7. The white phosphor of claim 1, wherein the green phosphor comprises:
   20 to 50 parts by weight of the compound selected from the group consisting of the ZnS:(Cu,Al), ZnS:(Cu,Au,Al), and a combination thereof; and
   50 to 80 parts by weight of the (Sr$_{1-x}$Ca$_x$)Ga$_2$S$_4$:Eu (0≦x<0.2).

8. A light emission device comprising:
   opposing first and second substrates;
   an electron emission unit disposed on an inner surface of the first substrate; and
   a light emission unit disposed on an inner surface of the second substrate, comprising white phosphor layers disposed on the inner surface of the second substrate, the white phosphor comprising,
   40 to 50 parts by weight of a blue phosphor selected from the group consisting of ZnS:(Ag,Cl), ZnS:(Ag,Al), ZnS:(Ag,Al,Cl), and a combination thereof,
   23 to 36 parts by weight of a green phosphor comprising (Sr$_{1-x}$Ca$_x$)Ga$_2$S$_4$:Eu (0≦x<0.2) and a compound selected from the group consisting of ZnS:(Cu,Al), ZnS:(Cu,Au,Al), and a combination thereof, and
   20 to 30 parts by weight of a red phosphor selected from the group consisting of Y$_2$O$_3$:Eu, Y$_2$O$_3$:(Eu,Tb), Y$_2$O$_2$S:Eu, Y$_2$O$_2$S:(Eu,Tb), and a combination thereof.

9. The light emission device of claim 8, wherein the white phosphor has a color temperature ranging from 10,000K to 13,000K, when excited by an electron beam.

10. The light emission device of claim 8, wherein the white phosphor comprises 40 to 45 parts by weight of the blue phosphor, 28 to 33 parts by weight of the green phosphor, and 26 to 28 parts by weight of the red phosphor.

11. The light emission device of claim 10, wherein the white phosphor has a color temperature ranging from 10,000K to 11,500K, when excited by an electron beam.

12. The light emission device of claim 8, wherein the white phosphor comprises 46 to 50 parts by weight of the blue phosphor, 25 to 28 parts by weight of the green phosphor, and 25 to 27 parts by weight of the red phosphor.

13. The light emission device of claim 12, wherein the white phosphor has a color temperature ranging from 11,000K to 13,000K, when excited by an electron beam.

14. The light emission device of claim 8, wherein the green phosphor comprises:
   20 to 50 parts by weight of the compound selected from the group consisting of the ZnS:(Cu,Al), ZnS:(Cu,Au,Al), and a combination thereof; and
   50 to 80 parts by weight of the (Sr$_{1-x}$Ca$_x$)Ga$_2$S$_4$:Eu (0≦x<0.2).

15. The light emission device of claim 8, wherein the light emission unit comprises a metallic reflective anode disposed on the white phosphor layers.

16. The light emission device of claim 8, wherein the light emission unit comprises an anode comprising:
   a transparent conductive layer disposed between the second substrate and the white phosphor layers; and
   a metallic reflective layer disposed on the white phosphor layers.

17. The light emission device of claim 8, wherein the electron emission unit comprises:
   a first electrode disposed in rows on the first substrate;
   an insulating layer disposed on the first electrode;
   a second electrode disposed in columns on the insulating layer and extending across the rows of first electrode; and
   electron emission regions disposed in the insulating layer and electrically connected to the first electrode.

18. The light emission device of claim 17, wherein the electron emission regions comprise one selected from the group consisting of a carbon-based material, a nanometer-sized material, and a combination thereof.

19. A liquid crystal display (LCD) comprising:
   a light emission device comprising,
      opposing first and second substrates,
      an electron emission unit disposed on an inner surface of the first substrate, and
      a light emission unit comprising white phosphor layers disposed on an inner surface of the second substrate, the white phosphor comprising, 40 to 50 parts by weight of a blue phosphor selected from the group consisting of ZnS:(Ag,Cl), ZnS:(Ag,Al), ZnS:(Ag,Al,Cl), and a combination thereof, 23 to 36 parts by weight of a green phosphor comprising $(Sr_{1-x}Ca_x)Ga_2S_4$:Eu $(0 \leq x < 0.2)$ and a compound selected from the group consisting of ZnS:(Cu,Al), ZnS:(Cu,Au,Al), and a combination thereof, and 20 to 30 parts by weight of a red phosphor selected from the group consisting of $Y_2O_3$:Eu, $Y_2O_3$:(Eu,Tb), $Y_2O_2S$:Eu, $Y_2O_2S$:(Eu,Tb), and a combination thereof; and a liquid crystal panel assembly facing the light emission device, to display an image by selectively transmitting light emitted from the light emission device.

20. The liquid crystal display of claim 19, wherein the light emission device has a color temperature ranging from 10,000K to 13,000K.

21. The liquid crystal display of claim 19, wherein the white phosphor comprises 40 to 45 parts by weight of the blue phosphor, 28 to 33 parts by weight of the green phosphor, and 26 to 28 parts by weight of the red phosphor.

22. The liquid crystal display of claim 21, wherein the white phosphor has a color temperature ranging from 10,000K to 11,500K, when excited by an electron beam.

23. The liquid crystal display of claim 19, wherein the white phosphor comprises 46 to 50 parts by weight of the blue phosphor, 25 to 28 parts by weight of the green phosphor, and 25 to 27 parts by weight of the red phosphor.

24. The liquid crystal display of claim 23, wherein the light emission device has a color temperature ranging from 11,000K to 13,000K.

25. The liquid crystal display of claim 19, wherein the green phosphor comprises:

20 to 50 parts by weight of the compound selected from the group consisting of the ZnS:(Cu,Al), ZnS:(Cu,Au,Al), and a combination thereof; and 50 to 80 parts by weight of the $(Sr_{1-x}Ca_x)Ga_2S_4$:Eu $(0 \leq x < 0.2)$.

26. The light emission device of claim 19, wherein the light emission unit comprises an anode comprising:

a transparent conductive layer disposed between the second substrate and white phosphor layers; and a metallic reflective layer disposed on the white phosphor layers.

27. The light emission device of claim 19, wherein the electron emission unit comprises:

a first electrode disposed in rows on the first substrate;

an insulating layer disposed on the first electrode;

a second electrode disposed in columns on the insulating layer and extending across the rows of first electrode; and electron emission regions disposed in the insulating layer and electrically connected to the first electrode.

28. The light emission device of claim 27, wherein the electron emission regions comprise one selected from the group consisting of a carbon-based material, a nanometer-sized material, and a combination thereof.

* * * * *